United States Patent Office 3,032,807
Patented May 8, 1962

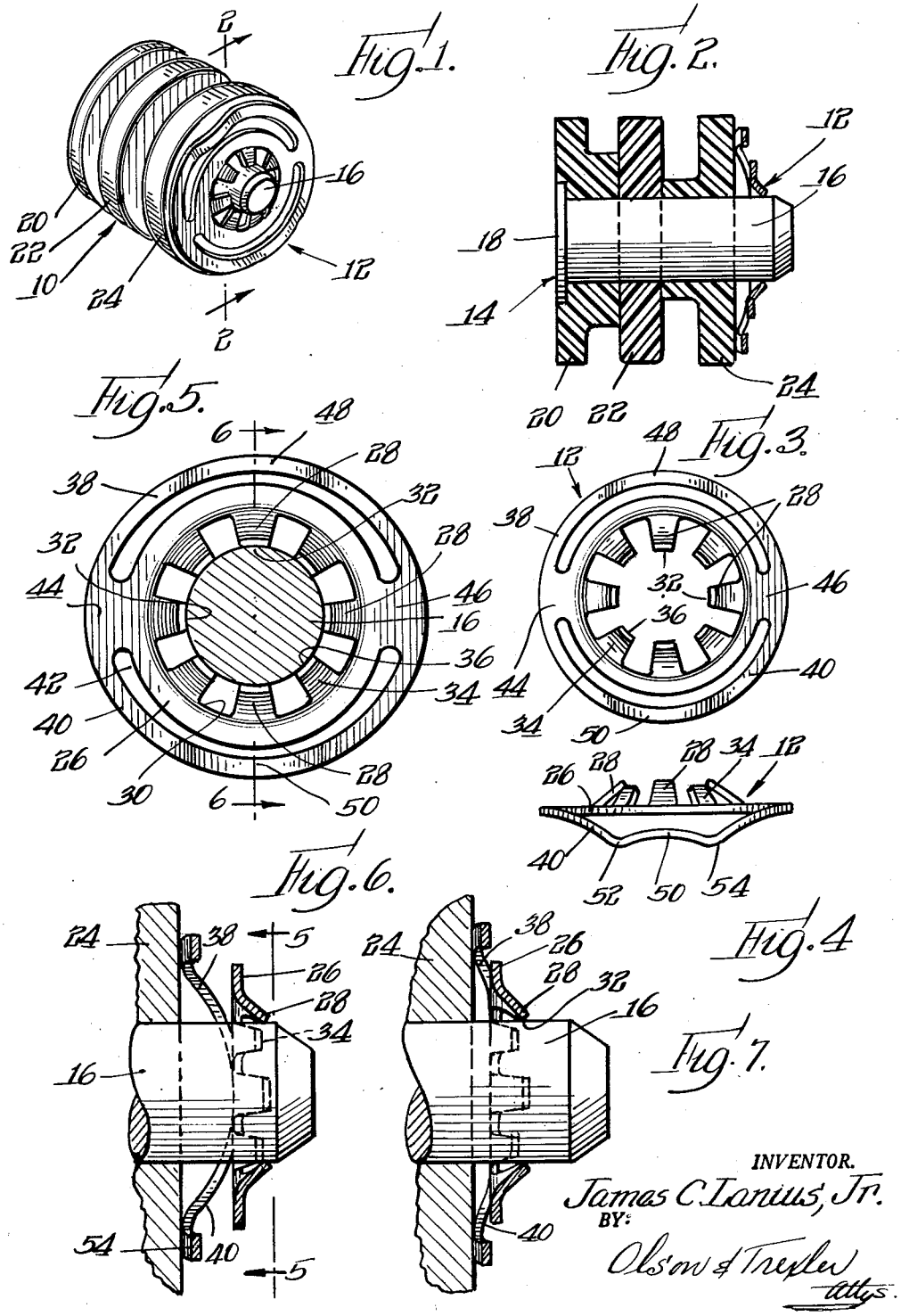

3,032,807
SPRING RETAINER
James C. Lanius, Jr., Elgin, Ill., assignor to Illinois
Tool Works, Inc., a corporation of Illinois
Filed Dec. 16, 1959, Ser. No. 857,291
7 Claims. (Cl. 16—97)

The present invention relates to a novel retainer device and more specifically, to a novel device for resiliently retaining a workpiece and to a roller assembly including such a device.

While many uses for the retainer device contemplated herein may suggest themselves, it is especially suitable for incorporation into an assembly including features of the present invention. In such an assembly the retainer serves to hold one or more parts on a shaft or stud so that the parts yield a limited amount axially of the stud or shaft. More specifically, one important object of the present invention is to provide a novel roller structure comprising a stud or shaft and a plurality of roller members disposed on the stud and resiliently clamped together so that they may yield or adjust axially in order to accommodate dimensional variations in track members or the like, with which the roller structure is to be assembled.

Another object of the present invention is to provide a novel one piece resilient sheet material spring retainer which is of simple and economical construction.

A further object of the present invention is to provide a novel one piece resilient sheet material retainer which may be easily and securely applied to an unthreaded stud or shaft or the like, and which is constructed so that it may engage and yieldably retain a workpiece on the stud without adversely affecting the security of its connection with the stud.

Other objects and advantages of the present invention will become apparent from the following description and the accompanying drawings wherein:

FIG. 1 is a perspective view showing a roller assembly including a retainer incorporating features of the present invention;

FIG. 2 is a sectional view taken along line 2—2 in FIG. 1;

FIG. 3 is a planned view showing a retainer incorporating features of the present invention;

FIG. 4 is an edge view of the retainer shown in FIG. 3;

FIG. 5 is a sectional view taken along line 5—5 in FIG. 6 showing the retainer partially applied to the work assembly;

FIG. 6 is a sectional view taken along line 6—6 in FIG. 5;

FIG. 7 is a sectional view similar to FIG. 2 showing in greater detail the condition of the retainer member when it is fully assembled with the work structure.

Referring now more specifically to the drawings wherein like parts are designated by the same numerals throughout the various figures, a work structure or roller assembly 10 includes features of the present invention and is shown best in FIGS. 1 and 2. The roller assembly comprises a spring retainer 12 constructed in accordance with the present invention and a stud member 14 having a smooth shank 16 and an enlarged head or flange portion 18 at one end thereof. A plurality of annular roller members 20, 22 and 24 is disposed on the shank 16. The roller members are freely axially slidable along the shank 16, but are normally resiliently or yieldably clamped together and against the head portion 18 by the spring retainer 12.

The roller assembly 10 may be used in various installations, but one purpose for which it is especially suitable is in an actuating mechanism for an automobile window. In such mechanisms the roller is assembled with and adapted to move along track members, not shown. Preferably the annular flange-like portions of the roller elements 20, 22 and 24 snugly embrace such track members so as to promote noiseless, rattle-free operation. The dimensions or thickness of such track members may vary as a result of manufacturing tolerances or other reasons.

In accordance with a feature of the present invention the roller structure 10 is adapted to accommodate such variations in thickness of the track members since the elements 20, 22 and 24 may spread apart axially of the shank 16, if necessary, under the yieldable clamping action provided by the spring retainer 12.

As shown in the drawings the retainer 12 is formed in one piece from resilient sheet material, preferably spring steel. The retainer is formed with an annular body portion 26 which, in the embodiment shown, is substantially flat and is adapted to be telescopically applied over the outer or free end portion of the stud. In order to provide means for securing the retainer to the stud shank 16, prongs 28 are equally spaced around and extend from integral junctions with an inner margin 30 of the body member 26. The prongs extend generally radially and are also inclined axially outwardly from the body portion 26 so as to present terminal end corner or tooth edges 32. When the prongs 28 are in an unstressed condition, the edges 32 define an imaginary circle having a diameter less than the diameter of the stud shank 16. Thus when the retainer is applied to the stud, the prongs 28 are flexed so that they resiliently and aggressively urge the tooth edges 32 into engagement with the stud for preventing retrograde movement of the retainer from the stud.

The device is provided with additional prongs 34 disposed between prongs 28. The prongs 34 may be identical to prongs 28 for providing additional securing or holding power, but the prongs 34 are preferably slightly shorter than the prongs 28 so that their terminal end edges 36 define a circle having a diameter substantially equal to the diameter of the stud 16. Furthermore, the end edges 36 are curved so as to conform to the surface of the shank 16. Thus during application of the retainer device to the stud shank, the ends of the prongs 34 slip easily along the shank and minimize any tendency of the device to become twisted or canted relative to the shank.

In accordance with a feature of the present invention, the device 12 is provided with a plurality of arcuate resilient spring elements 38 and 40 which extend along the curve of the margin of the body portion 26 opposite from the prongs. As shown in FIGS. 1, 3, 4 and 5 opposite ends of the spring elements 38 and 40 are integrally joined to an outer margin 42 of the body portion 26 by laterally extending connecting sections 44 and 46. As shown best in FIGS. 4 and 6, each of the spring elements is formed so that a central portion thereof is displaced axially from the plane of the body portion 26 and oppositely from the prongs. Thus, the mid-portions of the spring elements 38 and 40 are presented for engaging one side of a workpiece such as the roller element 24 for resiliently clamping the workpiece in position.

It will be noted that mid-portions 48 and 50 of the spring elements 38 and 40 respectively are flattened for widening the area of contact with the workpiece and thereby resisting any tendency for the retainer member to push or tilt relative to the stud. Preferably, the mid-portions of the spring elements are reversely bent as shown best in FIG. 4 so as to present spaced apart protuberance portions 52 and 54 for insuring two point contact of each spring element with the workpiece.

While the preferred embodiment of the present invention has been shown and described herein, it is obvious that many structural details may be changed without departing from the spirit and scope of the dependent claims.

The invention is claimed as follows:

1. A one-piece resilient sheet material retainer comprising an annular body portion, a plurality of prongs projecting generally radially from an inner margin of said body portion for aggressively engaging an axially extending workpiece when the retainer is axially telescopically applied to the workpiece for resisting removal of the retainer from the workpiece, a plurality of spring elements extending generally circumferentially of and in detached relation to an outer margin of said body portion, said spring elements respectively having opposite ends integrally connected to said last mentioned margin and intermediate portions displaced axially from said body portion for engaging and resiliently retaining a second workpiece.

2. A retainer, as defined in claim 1, wherein said intermediate portions of said spring elements are substantially flattened for promoting engagement with said second workpiece at spaced areas for resisting tilting of the retainer.

3. A retainer, as defined in claim 2, wherein said generally flattened intermediate portions of said spring elements are reversely bent towards said body portions, each of said spring elements presenting a pair of spaced apart protuberance portions for engaging the second workpiece.

4. A one-piece resilient sheet material retainer comprising an annular body portion, a plurality of prongs projecting radially inwardly from an inner margin of said body portion and inclined axially in one direction from said body portion, said prongs presenting terminal edges defining a circle having a diameter less than a diameter of a shank to which the retainer is to be applied so that said edges will engage said shank and resist removal of the retainer from the shank, and a plurality of arcuate spring elements extending generally circumferentially of and in detached relation to an outer margin of said body portion, said arcuate spring elements having opposite ends thereof integrally connected to said outer margin of the body portion and intermediate portions displaced axially from said body portion and oppositely from said prongs for engaging and resiliently retaining a workpiece assembled with said shank.

5. A retainer, as defined in claim 4, wherein intermediate portions of said spring elements are generally flattened and disposed along a plane which is perpendicular to a central axis of said retainer whereby each spring element is adapted to engage spaced areas of said workpiece for resisting tilting of a retainer.

6. A retainer, as defined in claim 4, which includes additional prongs extending from said body portion between the first mentioned prongs, said additional prongs being slightly shorter than said first mentioned prongs and presenting end edges defining a circle larger than said first mentioned circle and substantially equal to the diameter of the shank to which the retainer is to be applied, said additional prongs serving to resist tilting of the retainer relative to the shank.

7. A roller assembly comprising a member having a shank, a plurality of annular roller members disposed on said shank and being axially and rotatably movable relative to each other and to said shank, said annular roller members including radially extending portions defining annular slots therebetween for accommodating complementary track members and the like therebetween, the axial relative movement between said annular roller members serving to permit variations in thickness of the track members, abutment means fixed with respect to said shank and positively limiting axial movement of said annular roller members in one direction, and a one-piece resilient sheet material retainer assembled with said shank and resiliently retaining said annular roller members against axial movement in an opposite direction, said retainer comprising an annular body portion telescopically associated with said shank, means projecting inwardly from said body portion and engaging said shank and positively preventing axial movement of said retainer relative to said shank in said opposite direction, and a plurality of arcuate spring elements extending generally circumferentially of and in detached relation to an outer margin of said body portion, said arcuate spring elements having opposite ends thereof integrally connected to said outer margin of the body portion and intermediate portions displaced axially from said body portion in said one direction and having smooth side surfaces in engagement with an endmost annular roller member.

References Cited in the file of this patent

UNITED STATES PATENTS

| | | |
|---|---|---|
| 279,606 | Shaffner | June 19, 1883 |
| 343,368 | Gansz | June 8, 1886 |
| 498,046 | Allen | May 23, 1893 |
| 1,898,202 | Murray | Feb. 21, 1933 |
| 2,275,058 | Draving | Mar. 3, 1942 |
| 2,712,262 | Knohl | July 5, 1955 |